J. LEHR.
PROCESS FOR MAKING RUBBER ACID PROOF CONTAINERS.
APPLICATION FILED SEPT. 23, 1921.
1,431,471.  Patented Oct. 10, 1922.
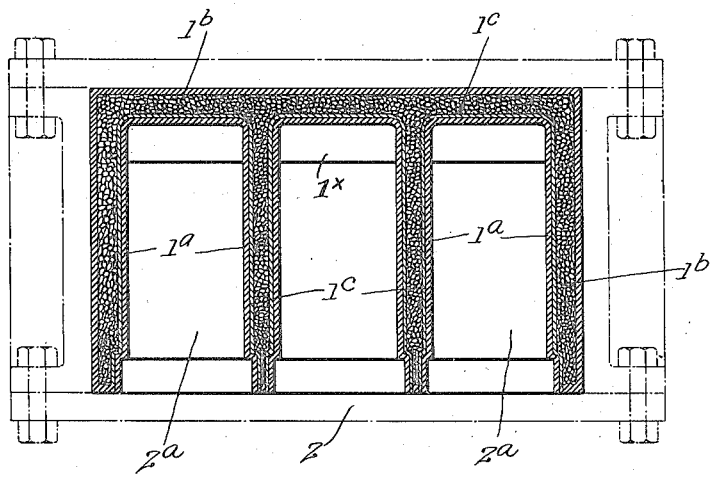
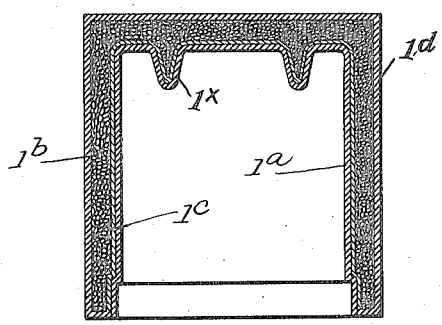
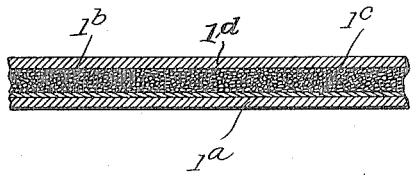
Inventor
John Lehr
By Spear Middleton
Donaldson & Hall
Attorney Patented Oct. 10, 1922.

1,431,471

UNITED STATES PATENT OFFICE.

JOHN LEHR, OF AKRON, OHIO, ASSIGNOR TO THE MILLER RUBBER COMPANY, OF AKRON, OHIO, A CORPORATION OF OHIO.

PROCESS FOR MAKING RUBBER ACID-PROOF CONTAINERS.

Application filed September 23, 1921. Serial No. 502,795.

*To all whom it may concern:*

Be it known that I, JOHN LEHR, a citizen of the United States, and resident of Akron, in the county of Summit and State of Ohio, have invented certain new and useful Improvements in Process for Making Rubber Acid-Proof Containers, of which the following is a specification.

My present invention relates to improvements in rubber acid proof containers and is an improvement upon the invention disclosed in an application filed by John F. Johnston and George W. Bulley on the 25th day of May, 1921, Seriel Number 472,427.

One object of the invention is to prevent the formation of air bubbles or blisters in the finished product.

Another object is to prevent any possibility of displacement of the inner hard rubber layer relative to the core during vulcanization.

A further object is to prevent migration of the blowing agent from one layer into the other during the curing of the article, and still other objects are to secure a thorough homogeneous union between the layers composing the article, and a stronger container. The said invention is defined by the claims appended hereto.

In order that my invention may be more readily understood I have appended hereto a drawing illustrating the container and a mold for making the same in which—

Fig. 1 is a longitudinal vertical section through the container with the forming or vulcanizing mold indicated in doted lines.

Fig. 2 is a transverse section through the container with the showing of the mold omitted.

Fig. 3 is an enlarged sectional view of one of the cell walls.

A container constructed in accordance with my invention is illustrated at 1 in Figs. 1 and 2 in inverted position which shows it as a unitary multicelled battery box having transverse partitions forming with the side and end walls and bottom three compartments or cells. It will be understood, however, that this number is shown for convenience only, as the box may be made as a single cell or with any additional number as may be desired. The bottom is shown as provided with the customary bridges or ribs $1^x$ for supporting the usual plates (not shown) clear of the bottom.

The side, end walls and bottom comprising the entire container, are constructed of hard rubber compound, the inner surface or portion being of dense rubber formed by a solid layer of hard rubber compound indicated at $1^a$, and the outer portion comprising a layer $1^b$ of cellular formation having a substantially smooth exterior surface $1^d$. Between these two layers or portions but integrally united therewith by vulcanization is a layer of fabric $1^c$.

According to one manner of carrying out my invention I provide a metal mold 2 comprising side, end, bottom, and top walls $2^b$, $2^c$ and $2^d$ detachably connected together by any suitable means, the bottom $2^c$ having core projections $2^a$ to give the proper shape to the cell cavities, said core parts being preferably detachable from the bottom member.

In order to prepare the article prior to vulcanization, all mold cores designed to form liquid retaining cavities in the article are first cleaned and given a coating of borax and water-glass solution, the purpose of which is to enable the easy removal of the articles when finished. After this coating is dry a coating of rubber cement is applied thereto, the object of which is to hold the rubber compound to the cores. After vulcanization, the cement having been vulcanized integrally with the article, the water-glass and borax coating alone separates the article from the core from which it may be easily removed.

Solid hard rubber compound calendered to the proper thicknes and cut into pieces of the proper size and shape is applied to the core surfaces and rolled down to exclude all air from between the rubber and core and to seam the rubber together at the joints to produce the interior surface portion $1^a$. The layers of friction fabric are then applied to the exterior surfaces of the inner layer and rolled in the same manner, the fabric having its edges overlapping where they join.

A hard sponge rubber compound, to wit, hard rubber compound containing a blowing agent such as water, and calendered to the required thickness, is applied over the fabric in a similar manner.

The exterior mold walls $1^d$ are then applied, completely enclosing the container, and the mold subjected to the proper curing temperature until vulcanization is complete, preferably in a steam chamber.

The heat of vulcanization gasifies the blowing agent producing the cellular formation, and the expansion forces the rubber against the mold walls and aids in producing a substantially smooth exterior surface. After the curing is complete the steam is shut off and the mold chilled, conveniently by spraying it with cold water.

This causes the exterior surface of the container to be rigidly set before the gases condense within the cells and prevents any collapse or distortion.

I have found that by the use of a fabric layer, which is practically inextensible closely applied to the inner non cellular layer after all the air is excluded or forced out from between the rubber layer and core, effectually prevents the hard rubber layer from displacement on the core, either by bulging or by slipping when softened by the curing heat, while at the same time the presence of the fabric in the completed container reinforces the same and produces a stronger article.

I have further found that in manufacturing such articles with the layer containing the blower in direct contact with the inner non-blowing layer, there is a tendency for the blowing agent to migrate or penetrate said inner layer, but this is prevented by the presence of the fabric layer.

Having thus described my invention what I claim is:

1. The process herein described which consists in building upon a mold core an impervious, vulcanizable layer, surrounding the impervious layer with a blower containing vulcanizable compound and vulcanizing both compounds simultaneously in a mold while supporting the impervious layer against collapse by means additional to the mold and core.

2. The process of making a liquid container which consists in forming a lining of impervious vulcanizable compound and a backing of spongy vulcanizable compound and supporting the lining during vulcanization by means of a binding of textile material which eventually remains imbedded in the article.

3. The process of making a liquid container of vulcanized rubber compounds which consists in building an inner lining of dense compound and a surrounding layer of cellular compound, supporting the inner lining during vulcanization independent of the cellular compound, and expanding the cellular compound until it forms an integral article with the inner lining and its supporting means.

4. The hereindescribed method of making acid proof containers which consists in applying to a suitable core, an inner layer of solid hard rubber compound, superposing thereon and pressing thereagainst a layer of friction fabric and applying over said friction fabric a layer of hard rubber compound containing a blowing agent.

5. The process of making a liquid container which consists in forming a lining of container shape of imperious rubber compound, and a backing of spongy vulcanizable compound with an interposed supporting layer of textile material, and supplying heat directly to the spongy compound, and causing it to expand said spongy compound and cause the fabric to be held against the liner under compression during the cure.

In testimony whereof I affix my signature.

JOHN LEHR.